United States Patent [19]
Pinchott et al.

[11] Patent Number: 5,813,655
[45] Date of Patent: Sep. 29, 1998

[54] REMOTE-CONTROL ON/OFF VALVE

[76] Inventors: Gordon A. Pinchott, 3515 Corbridge La., Rockford, Ill. 61107; Richard A. Nielsen, 216 $7^{th}$ St., Rockford, Ill. 61104; John W. Rosenbloom, 2118 Oaklawn Ave., Rockford, Ill. 61107

[21] Appl. No.: 728,758

[22] Filed: Oct. 11, 1996

[51] Int. Cl.$^6$ ................................................ F16K 31/02
[52] U.S. Cl. ............................... 251/129.04; 251/129.03; 251/288; 239/67
[58] Field of Search .............................. 251/129.04, 304, 251/315.01, 286, 288, 12, 25, 129.03; 239/570, 581.1, 67, 69, 70, 71, DIG. 15; 137/624.14

[56] References Cited

U.S. PATENT DOCUMENTS

| | | | |
|---|---|---|---|
| 4,838,310 | 6/1989 | Scott et al. ..................... | 251/129.04 X |
| 5,333,785 | 8/1994 | Dodds et al. ..................... | 239/67 X |

FOREIGN PATENT DOCUMENTS 2707219  1/1979  Germany ................................. 239/67

*Primary Examiner*—Kevin Lee
*Attorney, Agent, or Firm*—Leydig, Voit & Mayer, Ltd.

[57] ABSTRACT

A compact, portable, radio-controlled on/off valve for use with a garden hose has low energy consumption by using a water-powered motor for driving the valve into open and closed positions. The on/off valve has a pilot device for starting water flow through the water-powered motor. A low-power local electrical energy source, such as a battery pack, powers the pilot device and a receiver for receiving control signals. Upon receiving a control signal, the pilot device is energized briefly to start water flow through the water-powered motor. The water-powered motor then moves the valve from a closed position to an open position, or from an open position to a closed position.

17 Claims, 4 Drawing Sheets

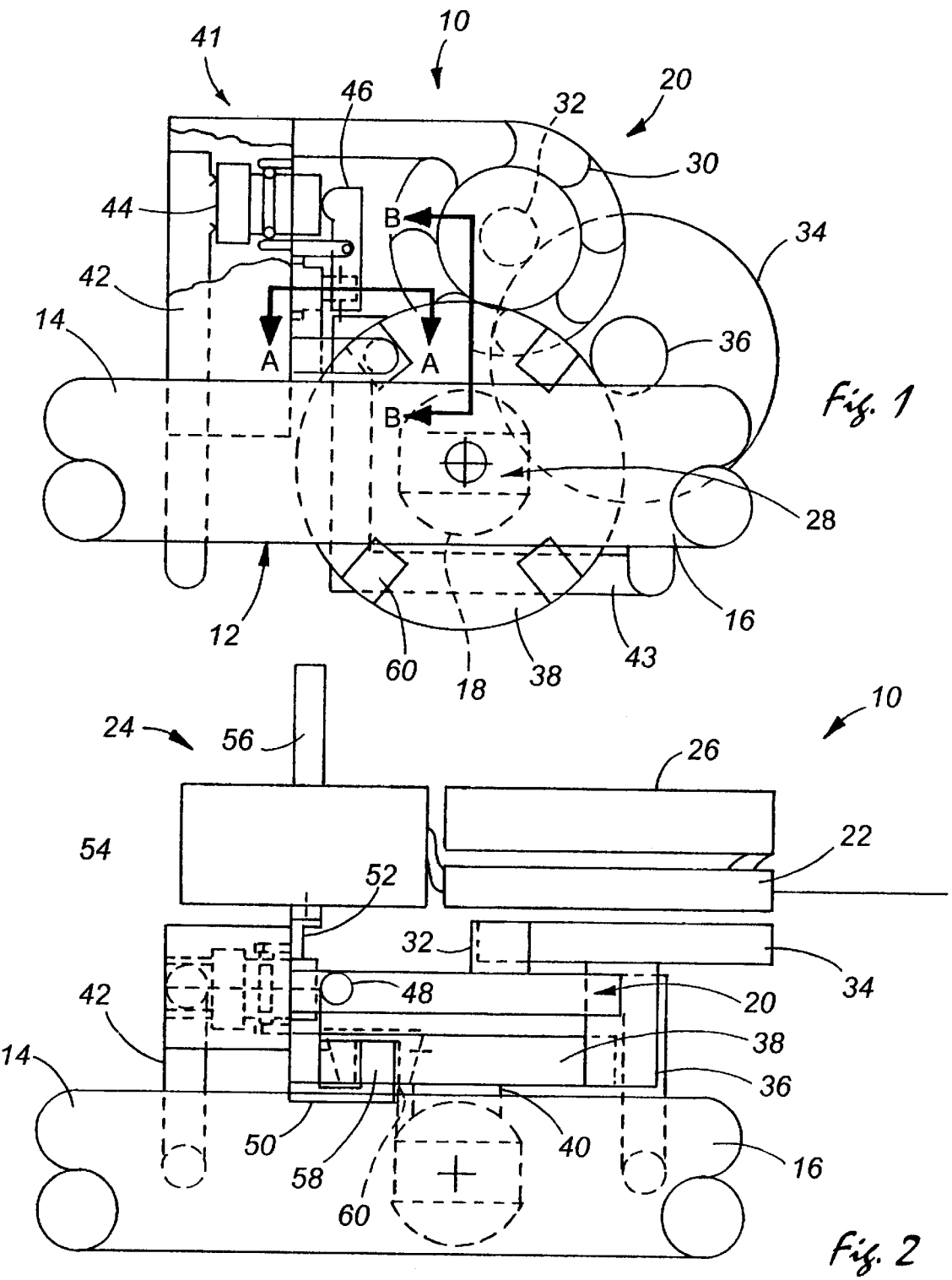

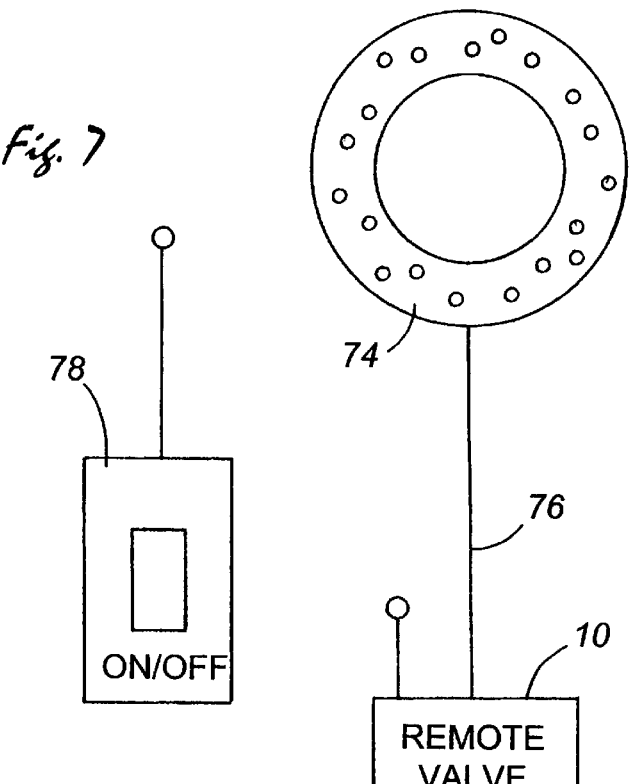
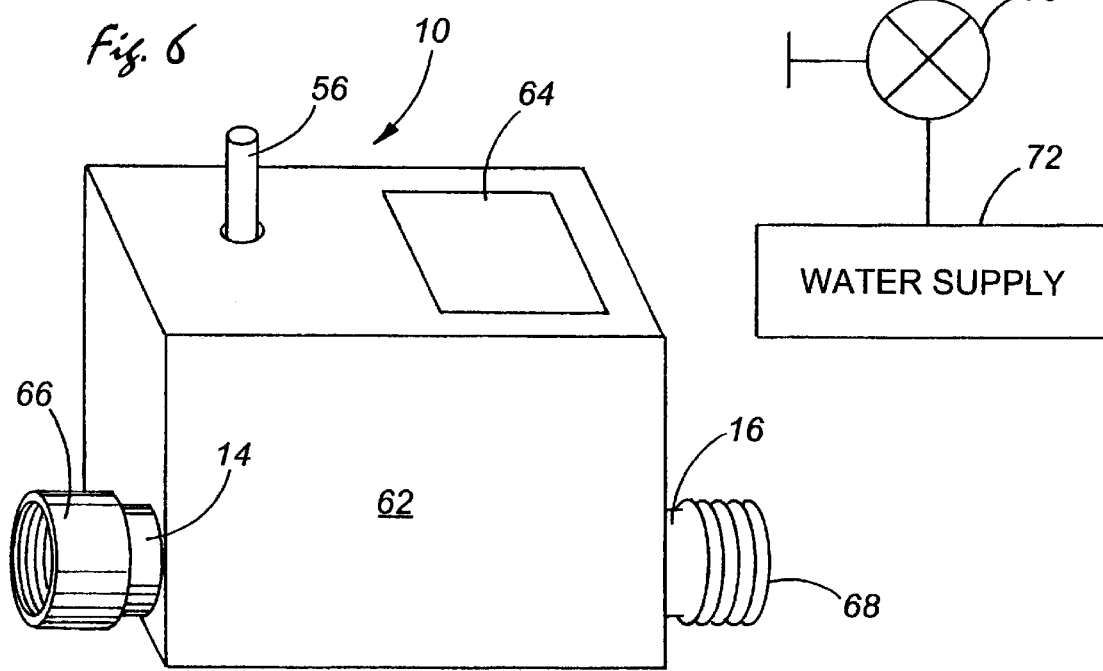

REMOTE-CONTROL ON/OFF VALVE

FIELD OF THE INVENTION

This invention relates generally to valves, and more particularly to remotely controlled valves for use in irrigation systems for controlling water flow.

BACKGROUND OF THE INVENTION

In large agricultural irrigation systems, it is known to use remote-control valves to control water flow in different branches of a water distribution network. A remote-control valve in such an application typically employs a radio receiver for receiving control signals transmitted from a user-operated transmitter. The use of remote-control valves allows the operator of an irrigation system to control water distribution by opening and closing the valves from a distance without having to travel to the physical locations of the valves.

The advantageous use of remote-control valves is not limited to large irrigation systems. In yard and garden applications in a household environment, there is also a need for remote-control on/off valves. For example, portable sprinklers are commonly used to water lawns and flora surrounding a house. A portable sprinkler is typically connected to a manually operated faucet on the exterior wall of the house via a garden hose. If the user wants to reposition the sprinkler, he has to go to the faucet to close it, go to the sprinkler and move it to a new place, then go back to the faucet to open it to restart the water flow. The need to go back and forth between the sprinkler and the faucet can be rather inconvenient, especially when the distance between the sprinkler and the faucet is long, or when many sprinklers are connected to the faucet. If a remote-control on/off valve were positioned between the faucet and the sprinkler, the faucet could be left open, and the flow of the water could be stopped or started by simply actuating a remote controller. In this way, the user would no longer be required to make successive trips to the water supply faucet. Nevertheless, remote-control valves used in irrigation networks buried underground tend to be fairly complex, large, and expensive and are therefore not suitable for typical yard and garden applications. Insofar as applicants are aware, remote-control valves that are portable and sufficiently compact and easy to use so as to be suitable for yard and garden applications have not been available as of the present invention.

Because the receiver circuit in a remote-control valve and the mechanism for opening or closing the valve operate on electrical energy, one important aspect in designing a remote-control valve is the supply of electrical energy to the valve. One approach used in the past is to connect the remote-control valve by electrical wires to a remote power source, such as a conventional AC outlet. Although such an approach may be acceptable in irrigation systems in which both the water distribution network and the electrical wiring are permanently buried underground, it is generally not desirable in a yard and garden application in which the locations of remote-control valves and sprinklers are likely to be changed from time to time. The electrical wiring tends to restrict the possible placement of the valves, and the need to handle electrical wires and making electrical connections can make the valves inconvenient to use. Moreover, the combination of electrical wires typically carrying 110 volts AC with garden hoses used in the household irrigation applications can raise serious safety concerns. It is therefore preferable to use a local low-power electrical energy source, such as a battery pack, to power a remote-control valve designed for use with a garden hose in yard and garden applications.

A local low-power electrical energy source, however, has a fairly limited amount of stored energy. The operation of the remote-control valve, on the other hand, can be rather energy consuming. Remote-control valves in the past typically use motors or solenoids to open and close the valves and to hold the valves in the desired positions, and the power consumption can be very significant. As a result, the energy stored in the local energy source can be drained rapidly so that the remote-control valve is not capable of providing service for a sufficiently long period of time, such as a full gardening season.

One proposed approach to address this problem is to somehow replenish the electrical energy in the local energy source during operation. For example, U.S. Pat. No. 4,838, 310 to Scott et al. discloses a remote-control irrigation system with remote-control valves powered by a rechargeable battery. An impeller is positioned in the water pipe of the irrigation system and is coupled to a generator. When the valve is open, water flows through the pipe and rotates the impeller, which in turn drives the generator to charge the battery.

Because the impeller is disposed in a water pipe, this remote-control valve system is not portable and therefore not suitable for yard and garden applications. Moreover, positioning the impeller in the water pipe tends to impede the water flow. The inclusion of the generator and recharging circuitry increases the complexity and cost of the valve system. Ultimately, this approach does not directly address the basic problem of the high-power-consumption nature of prior art remote-control valves.

SUMMARY OF THE INVENTION

In view of the foregoing, it is a primary object of the present invention to provide a remote-control on/off valve suitable for yard and garden applications that is sufficiently inexpensive and easy to use such that an ordinary homeowner could purchase it, e.g. from a local hardware store, and simply connect it to a garden hose, and the valve would provide substantially maintenance-free service for a full gardening season.

To that end, it is an object of the present invention to provide a portable, remote-control valve that is simple and compact and has sufficiently low power consumption so that a low-power local electrical power source, such as a battery pack, is capable of powering the valve for a sufficiently long period of time, such as a full gardening season, without the need for replacement or recharging.

It is a more specific object of the present invention to provide a compact, portable, remote-control on/off valve powered by a local low-power electrical power source that has an on/off mechanism that requires a sufficiently low amount of energy to operate so that the power source is capable of powering the operation of the valve for a sufficiently long period of time.

In accordance with these and other objects of the present invention, there is provided a remote-control on/off valve that utilizes a water-powered motor to move a valve member between on and off positions. The water-powered motor is disposed in a flow path parallel to the valve member. The remote-control valve has a receiver for receiving control signals which are wirelessly transmitted, and a pilot device for initiating flow through the parallel flow path to activate the water-powered motor. Both the receiver and the pilot device are powered by a local low-power electrical energy source, such as a battery pack. After receiving a control signal, the receiver triggers the pilot device to initiate flow through the water-powered motor to move the valve member from an initial off position to an on position, or from an initial on position to an off position.

It is a feature of the present invention to utilize a water-powered motor to provide the energy required to drive the valve from on to off and from off to on, and a pilot device to activate the water-powered motor upon receiving a control signal. Thus, during normal operation, the only expenditure of power is for powering the receiver, which generally requires fairly low power to operate. When the valve is opened or closed, the only additional power required is the brief instance of power needed for the pilot device to actuate the water-powered motor. The low power consumption of this system for each on/off operation results in significantly improved service life of the low-power energy source.

It is another feature of the present invention that the user control of the remote-control valve is an extremely simple "one-touch" operation of the remote controller. There is no need to continuously hold the control button in effort to release it at the precise right time in order to leave the valve in the desired position. All the user has to do to operate the valve is to push the control button once to send a control signal to trigger the valve, and the mechanical setup in the valve allows it to run until the next predefined on/off position is reached.

Other objects and advantages will become apparent with reference to the following detailed description when taken in conjunction with the drawings in which:

BRIEF DESCRIPTION OF THE DRAWINGS

FIG. 1 is a plan view showing, in a somewhat schematic form, an embodiment of the remote-control valve of the present invention;

FIG. 2 is an elevation view of the remote-control valve of FIG. 1 in a direction perpendicular to a main water conduit of the valve;

FIG. 6 is a perspective view of the remote-control valve packaged in a compact housing;

FIG. 7 is a schematic view showing a simple irrigation system exemplifying the application of the remote-control valve of the present invention.

Figure 3:
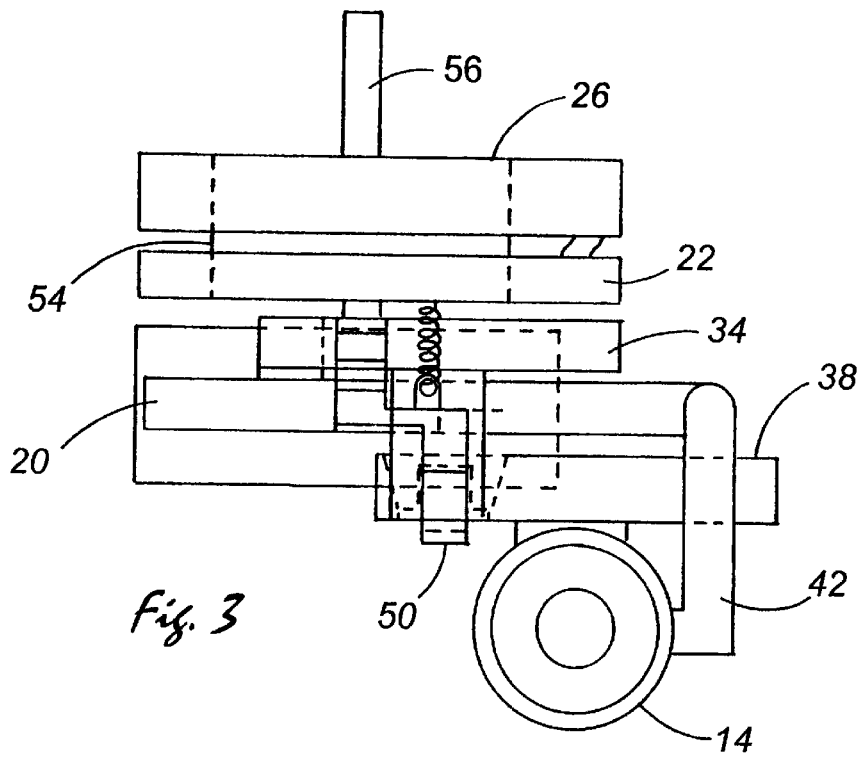
FIG. 3 is an elevation view of the remote-control valve of the FIG. 1 along the axis of the main water conduit.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 shows, in a somewhat schematic form, an embodiment of the remote-control on/off valve 10 of the present invention. The remote-control valve 10 has a main conduit 12 which includes an inlet port 14, an outlet port 16, and a valve member 18 disposed between the inlet and outlet ports to control the water flow through the main conduit.

The valve member 18 is coupled to a water-powered motor 20, which is used to drive the valve member between on and off positions. The water-powered motor 20 is disposed in a flow path 41 which is parallel to the valve member 18 and draws water flow from the main conduit.

As shown in FIG. 2, the remote-control valve 10 has a receiver 22 which contains electronic circuits for receiving remote-control signals transmitted on a carrier wave, which preferably is at a radio frequency. The remote-control valve 10 further includes a pilot device 24, which when energized initiates water flow through the parallel flow path 41. Both the receiver 22 and the pilot device 24 are powered by a local low-power electrical energy source 26. In the present embodiment, the local electrical energy source 26 is a battery pack which preferably is configured to hold several dry-cell batteries of a compact size, such as size AA batteries.

Upon receiving a control signal, the receiver 22 triggers the pilot device 24, which in turn starts water flow through the parallel flow path 41 to activate the water-powered motor 20. The water-powered motor 20 then drives the valve member 18 to an open position if it is initially closed, or to a closed position if it is initially open. After the water-powered motor 20 is activated, the pilot device 24 is turned off so that it does not continue to draw electrical energy from the low-power source 26. When the valve member 18 driven by the water-powered motor 20 reaches the next on/off position, the water flow through the water-powered motor 20 is turned off, and the valve member is left in that position.

It is a feature of the present invention to utilize a water-powered motor 20 mechanically coupled to the valve member 18 for driving it, and connected in a water circuit which parallels the valve member so that the motor is able to drive the valve regardless of whether the valve is initially open or closed. The water-powered motor 20 provides the energy required to drive the valve member 18 from on to off and from off to on, and a pilot device 24 is used to start water flow through the water-powered motor upon receiving a control signal. During normal operation, when the valve member 18 is in the desired on or off position, the pilot device 24 is off, and the only expenditure of electrical energy is for powering the receiver 22, which generally requires fairly low power to operate. When the valve member 18 is opened or closed, the only additional power required is the brief moment of power needed to energize the pilot device 24 to actuate the water-powered motor 20, which then completes the opening or closing operation. Thus, the amount of electrical energy required each time to open or close the valve is very small. Moreover, no electrical power is needed to maintain the valve in either the on or off position. Due to the low power consumption of this system, the service life the low-power energy source 26 is significantly extended and is intended to last for at least one full gardening season.

In more detail, in the embodiment of FIG. 1, the valve member 18 is presented as a ball valve having an aperture 28 therethrough. Thus, the valve member 18 has four alternate on and off positions spaced 90 degrees apart. When the valve member 18 is in an on position, the aperture 28 is aligned with the main conduit 12 to allow water to flow from the inlet port 14 to the outlet port 16. When the valve member 18 is in an off position, the aperture 28 is disposed transverse to the main conduit 12, thereby blocking the water flow therethrough.

The valve member 18 is coupled to the water-powered motor 20 via a gear train. As illustrated in FIG. 1, the water-powered motor 20 includes an impeller 30. The shaft of the impeller 30 has a cogwheel 32 which is in meshing engagement with a first gear 34. A cogwheel 36 fixedly attached to shaft of the first gear meshes with a second gear 38. The second gear 38 is coaxially fixed on the drive shaft 40 (as shown on FIG. 2) of the valve member 18. Thus, when water is passed through the water-powered motor 20, the rotation of the impeller 30 causes the ball valve to be rotated in a predetermined direction alternately between its on and off positions.

As illustrated in FIG. 1, the parallel flow path 41 includes an inlet conduit 42, the motor 20, and an return conduit 43. Water flow for powering the motor 20 is introduced via the inlet conduit 42 which draws flow from the inlet port 14 of the main conduit 12. The water that flows through the motor 20 is returned to the outlet port 16 of the main conduit via the return conduit 43. A control valve 44 disposed between the inlet conduit 42 and the impeller 30 is used to control the water flow through the water-powered motor 20. In the present embodiment, the control valve 44 is a piston valve. When the control valve 44 is open, water flows through the motor 20 and causes the ball valve 18 to be rotated. When the control valve 44 is closed, water flow through the motor is cut off and the motor is disabled.

Figures 4A, 4B, 5:
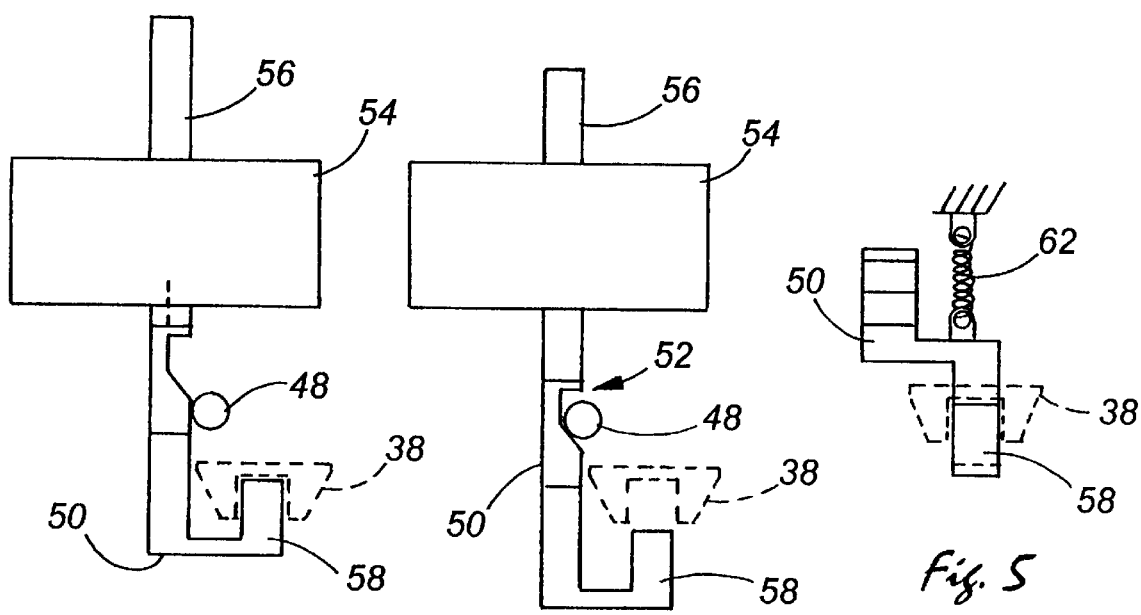
FIGS. 4A and 4B are fragmentary views of the remote-control valve of FIG. 1 generally along the line A—A, showing a solenoid and a stop arm.
FIG. 5 is a fragmentary view of the remote-control valve of FIG. 1 generally along the line B—B showing the stop arm.

The opening and closing of the control valve 44 is controlled by means of a lever 46. One end of the lever 46 engages the back of the control valve 44. The other end of the lever 46 has a roller 48 (FIG. 2) which engages a stop arm 50. The stop arm 50 is supported for movement in a direction parallel to the rotational axis of the second gear 38 and transverse to the lever 46. The upper section of the stop arm 50 has a recess 52 formed therein. As can be best seen in FIG. 4A, during normal operation when the ball valve 18 is not being moved, the roller 48 rests on the flat portion of the stop arm 50, and the engagement between the roller and the stop arm causes the other end of the lever 46 to push down on the control valve 44, thereby maintaining it in the closed position.

In the present embodiment, the pilot device 24 includes a solenoid 54. The armature 56 of the solenoid 54 is aligned with and contacts the upper section of the stop arm 50. When the solenoid 54 is energized, the armature 56 moves downward and pushes the stop arm 50 into the position illustrated in FIG. 4B. When the stop arm 50 is in this position, the roller 48 of the lever 46 is allowed to fall into the recess 52 of the stop arm, thereby relieving the holding force on the control valve 44 exerted by the lever. The control valve 44 is thus allowed to be pushed open by the water pressure in the inlet conduit 42. In this way, energizing the solenoid 54 causes the opening of the control valve 44, thereby activating the water-powered motor 20.

In accordance with a feature of the present embodiment, the pilot device 24 is associated with a detent mechanism which is capable of allowing the ball valve 18 to rotate in one direction alternately between on and off positions, and has detent stops corresponding to each of the on and off positions of the valve member. The detent mechanism includes the stop arm 50 and the second gear 38 which is secured to the drive shaft of the valve member 18. As illustrated in FIG. 2, the lower section of the stop arm 50 is generally L-shaped, with an upward pointing detent head 58 at the end of the "L". The second gear 38 has four slots 60 on its underside corresponding to the four on and off positions of the valve member 18. The slots 60 are sized for receiving the detent head 58. When the valve member 18 is in one of its on/off positions, the detent head 58 is aligned with one of the slots. As can be best seen in FIG. 5, the stop arm 50 is biased upward by a spring 62 so that the detent head 58 is normally received in one of slots 60 when the valve is in one of the on and off positions. In this way, the stop arm 50 prevents the inadvertent rotation of the valve member 18.

Due to its simple construction, the remote-control valve 10 can be made fairly light and compact so that it is very portable and easy to handle. As shown in FIG. 6, in the preferred embodiment the entire valve is advantageously enclosed in a simple and compact housing 62, with the inlet port 14 and the outlet port 16 extending outward from the housing. The housing 62 may be made of durable plastic which is inexpensive and light in weight. A removable cover 64 on the housing 62 provides access to the battery pack 26 (FIG. 2), which is preferably held in a separate enclosure under the cover. A female hose connector 66 and a male hose connector 68 are disposed, respectively, at the ends of the inlet port 14 and the outlet port 16. The female connector 66 can be used to connect the remote-control valve directly to a manual valve on the exterior wall of a house. Alternatively, the valve 10 can be connected to the manual valve via a garden hose. The male connector 68 at the outlet end allows connection to an output device, such as a sprinkler, via a garden hose.

As illustrated in FIG. 6, the upper end of the armature 56 of the solenoid 54 (FIG. 2) protrudes outward from the housing 62. The exposed section of the armature 56 allows a user to manually move the armature to open the control valve 44 to activate the water-powered motor 20 to open or close the remote-control valve 10 in the event of low battery power or any electrical malfunction of the receiver 22 or the solenoid 54.

The operation of the remote-control valve 10 will now be described. Initially the remote-control valve 10 is in one of its on and off positions, and the detent head 58 is received in a corresponding slot 60 in the second gear 38. The lever 46 holds the control valve 44 down to maintain it in the closed position. When the receiver 22 receives a control signal, it triggers the solenoid driving circuit to energize the solenoid 54 for a brief period of time. The actuation of the solenoid 54 causes the armature 56 to push the stop arm 50 down to the position shown in FIG. 4B.

Due to the downward displacement of the stop arm 50, the detent head 58 is disengaged from the slot 60 so that the valve member can be rotated. The displacement of the stop arm 50 also allows the roller 48 to fall into the recess 52, and the lever pressure on the control valve 44 is relieved. Water pressure in the inlet bypass 42 pushes open the control valve 44, and water starts to flow through the water-powered motor 20. The rotation of the impeller 30 causes the valve member 18 to be rotated towards its next position.

The solenoid 54 is energized for only a brief moment to allow the second gear 38 to rotate to a position where the slot 60 is no longer aligned with the detent head 58 so that the detent head cannot fall back into the slot. At this point the solenoid 54 no longer has to be energized to hold the stop arm 50 in its released position, because the detent head 58 rides on the lower face of the second gear 38 as the valve member 18 is being rotated by the water-powered motor 20. When the valve member 18 is rotated into its next on/off position and the next slot 60 on the second gear 38 is rotated into alignment with the detent head 58, the spring 62 pulls the stop arm 50 upward and the detent head is pulled into the slot. The upward displacement of the stop arm 50 moves the roller 48 of the lever 46 out of the recess 52, and the lever pushes the control valve down into the closed position. The water flow through the impeller 30 is thus stopped and the remote-control valve 10 remains stationary until the solenoid is actuated again.

In view of the description above, it will be appreciated that the user control of the remote-control valve is an extremely simple "one-touch" operation of the remote controller. There is no need to continuously hold the control button on the remote controller in effort to release it at the precise right time in order to leave the valve in the desired position. All the user has to do to operate the valve is to push the control button once to send a control signal to trigger the valve. The mechanical setup in the valve allows it to run automatically to the next predefined on/off position, at which time the valve is stopped and the driving water flow to the water-powered motor is closed. Because the same control signal can be used to trigger the valve regardless of whether the valve is moved from on to off or from off to on, the remote controller can be made very simple. For instance, it may have a single pushbutton for transmitting the same control signal for both on and off operations.

FIG. 7 shows a simple irrigation system exemplifying a typical application of the remote-control valve 10 of the present invention. As illustrated, the valve 10 is interposed between a manually operated valve 70, such as a faucet on the exterior wall of a house. The manual valve is connected to a water supply 72. The inlet port of the remote-control valve 10 is connected to the manual valve 70. The outlet port of the valve 10 is connected to a sprinkler 74 (or another typical water dispensing device) via a garden hose 76.

A transmitter 78 is used to transmit control signals at a radio frequency to the valve 10. The transmitter can be made sufficiently small so that it can be conveniently carried by the user. During operation, the manual valve 70 is left open all the time. If the user wants to reposition the sprinkler, he can simply push the control button as he starts towards the sprinkler to turn it off, and push the same button again after repositioning the sprinkler to restart the water flow.

For simplicity of illustration, FIG. 7 shows only one sprinkler 74 connected to the remote-control valve 10. It is possible, of course, to use one valve to control two or more sprinklers. In such a case, the output of the valve 10 may be connected to a manifold which is in turn connected to the sprinklers.

Figure 8:
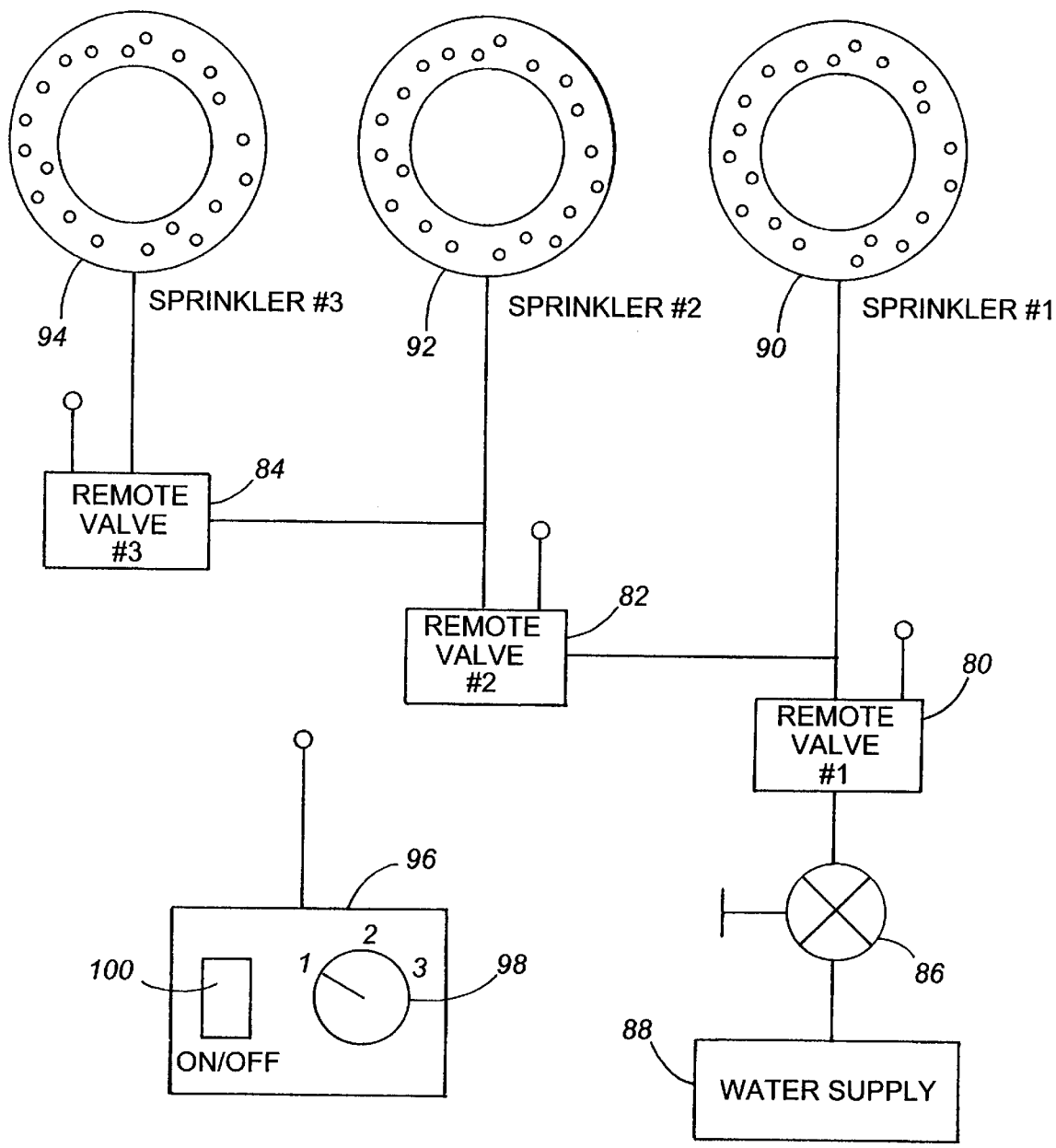
FIG. 8 is a schematic view showing another irrigation system having a water distribution network exemplifying the application of the remote-control valve of the present invention.

FIG. 8 Shows another irrigation system exemplifying the application of the remote-control valve of the prsent invention. This system uses a plurality of remote-control valves to form a network of sprinklers. In particular, the system of FIG. 8 has three remote-control valves 80, 82, 84. The input of the first valve 80 is connected to a manually operated valve 86 or faucet which is connected to the water supply 88. During operation, this manual valve 86 is left open. The output of the first remote-control valve 80 is connected to a first sprinkler 90 and the input of the second remote-control valve 82. The output of the second remote-control valve 82 is in turn connected to a second sprinkler 92 and the input of the third remote-control valve 84. The output of the third valve 84 is connected to a third sprinkler 94.

With this water distribution network, the user can selectively turn on or off different combinations of the three sprinklers 90, 92, 94. For example, turning the first valve 80 off will turn all three sprinklers off. If the first valve 80 is on, turning the second valve 82 off will turn off the second sprinkler 92 and the third sprinkler 94, while leaving the first sprinkler 90 on. If the first valve 80 and the second valve 82 are on, both the first and second sprinklers 90, 92 are on, and turning the third valve 84 on or off will turn the third sprinkler 94 on or off.

FIG. 8 also shows a transmitter 96 which is capable of individually controlling each of the three remote valves in the irrigation system. As illustrated, the transmitter 96 has a three-position switch 98. To turn a valve from on to off or from off to on, the user sets the selection switch 98 to the position corresponding to that valve, and actuates the on/off button 100 to transmit a control signal for that valve. The individual control of the valves can be accomplished, for example, by assigning a different signal carrier frequency to each valve in the system. Alternatively, the transmitter may use the same transmission frequency for all remote-control valves in the system, but include in each control signal an identification code which can be used by the receiver in each valve to determine whether it has been addressed. It will be appreciated that this network in FIG. 8 is provided only as an example illustrating the use of remote-control valves to control a network of sprinklers. The number of remote-control valves and the interconnection between the valves can be easily varied to form customized serial or parallel water-distribution networks with branches that can be selectively turned on and off.

What is claimed is:

1. A remote-control on/off valve powered by a low-power local electrical energy source comprising: a valve member having open and closed positions disposed in a main conduit;
    a water-powered motor in a parallel flow path which is in parallel with the main conduit, the water-powered motor being coupled to the valve member for driving the valve member between an open position and a closed position;
    a receiver powered by the local electrical power source for receiving wirelessly transmitted control signals; and
    a pilot device powered by the local electrical power source and connected to the receiver for initiating flow through the parallel flow path to activate the water-powered motor upon reception of a control signal by the receiver, and to terminate said flow to the water-powered motor when a subsequent open or closed position is reached.

2. A remote-control on/off valve as in claim 1, wherein the valve member is a ball valve having alternate open and closed positions.

3. A remote-control on/off valve as in claim 2, wherein the pilot device is associated with a detent mechanism coupled to the valve member and having detent positions corresponding to the open and closed positions of the valve member, the detent mechanism being capable of allowing the ball valve to rotate in a selected direction alternately between the open and closed positions and stopping water flow through the parallel flow path to disable the water-powered motor when the ball valve reaches one of the open and closed positions.

4. A remote-control on/off valve as in claim 3, wherein the pilot device includes a solenoid having an armature coupled to the detent mechanism for releasing the detent mechanism to initiate flow through the parallel flow path.

5. A remote-control on/off valve as in claim 4 wherein the armature has an externally accessible section for allowing manual movement thereof.

6. A remote-control on/off valve as in claim 1, wherein the low-power local electrical energy source includes at least one battery.

7. A remote-control on/off valve as in claim 1, wherein the control signals are transmitted at a radio frequency.

8. A radio-controlled hose shutoff valve for controlling flow between an inlet and an outlet in response to a radio control signal, and comprising in combination;
- a housing containing the radio-controlled hose shutoff valve and having inlet and outlet connectors for connecting the radio-controlled hose shutoff valve between a water source and output device;
- a valve member in the housing interposed between the inlet and the outlet for controlling flow therethrough, sequential detented positions associated with the valve member for defining open and closed valve positions;
- a flow path parallel to the valve member and including a water-powered motor, the water-powered motor being coupled by a mechanical drive to the valve member; and
- a plurality of low powered electrical components comprising a battery pack powering a radio receiver which triggers an electromechanical pilot device upon receipt of a control signal,
- the electromechanical pilot device being connected to initiate flow in the parallel flow path for driving the valve member from one detented position toward the next detented position, and means coupled to the mechanical drive for stopping the flow through the parallel flow path upon encountering the next detented position.

9. A radio-controlled hose shutoff valve as in claim 8, wherein the pilot device includes a solenoid.

10. A radio-controlled hose shutoff valve as in claim 8, wherein the parallel flow path includes a control valve for controlling flow through the parallel flow path, the electromagnetic pilot device being connected to open the control valve upon being triggered by the receiver.

11. A radio-controlled hose shutoff valve as in claim 8, wherein the valve member is a ball valve having alternate open and closed positions.

12. A radio-controlled on/off valve for use with a garden hose comprising:
- a housing containing the radio-controlled on/off valve and having inlet and outlet connectors for connecting the on/off valve between a water source and an output device;
- a ball valve in the housing interposed between the inlet and outlet connectors for controlling the flow therethrough, the ball valve being rotatable between alternate open and closed positions;
- a water-powered motor disposed in a parallel flow path which is in parallel with the ball valve, the water-powered motor being mechanically coupled to the ball valve for rotating the bass valve in a selected direction between the alternate open and closed positions, the parallel flow path including a control valve for controlling flow therethrough;
- a detent mechanism having detent positions associated with the open and closed positions of the ball valve, the detent mechanism being coupled to the ball valve and the control valve for allowing the ball valve to rotate between the alternate open and closed positions and stopping the rotation of the ball valve and closing the control valve when one of the open and closed position is reached;
- an electromechanical pilot device being connected for opening the control valve to activate the water-powered motor and temporarily releasing the detent mechanism to allow the ball valve to rotate between an open position and a closed position;
- a receiver for receiving wirelessly transmitted control signals and triggering the pilot device to activate the water-powered motor and release the detent mechanism upon receiving a control signal; and
- a battery pack powering the pilot device and the receiver.

13. A radio-controlled on/off valve as in claim 12, wherein the pilot device includes a solenoid having an armature coupled to the detent mechanism for releasing the detent mechanism to open the control valve.

14. A radio-controlled on/off valve as in claim 13, wherein the armature has an externally accessable section for allowing manual movement of the armature.

15. A remote-control on/off valve powered by a low-power local electrical energy source comprising:
- a valve member having open and closed positions disposed in a main conduit;
- a water-powered motor in a parallel flow path which is in parallel with the main conduit, the water-powered motor being coupled to the valve member for driving the valve member between an open position and a closed position;
- a receiver powered by the local electrical power source for receiving wirelessly transmitted control signals;
- a detent mechanism coupled to the valve member and having detent positions corresponding to open and closed positions of the valve member, the detent mechanism being capable of allowing the valve member to translate between open and closed positions and stopping the valve member when one of the open and closed positions is reached; and
- a pilot device powered by the local electrical power source, the pilot device connected to the receiver and the detent mechanism for temporarily releasing the detent mechanism upon reception of a control signal by the receiver to activate the water-powered motor and allow the valve to translate between an open and a closed position.

16. A remote-control on/off valve as in claim 15 wherein the valve member is a ball valve having alternate open and closed positions.

17. A remote-control on/off valve as in claim 15 wherein detent mechanism stops water flow through the parallel flow path to disable the water-powered motor when the ball valve reaches one of the open and closed positions.

* * * * *